United States Patent [19]

Kim

[11] Patent Number: 5,773,845

[45] Date of Patent: Jun. 30, 1998

[54] LIQUID CRYSTAL DISPLAY DEVICE WITH DECREASED LINE WIDTH AND METHOD OF FORMING THE SAME

[75] Inventor: Soo Manh Kim, Kyungki-do, Rep. of Korea

[73] Assignee: LG Electronics Inc., Seoul, Rep. of Korea

[21] Appl. No.: 610,755

[22] Filed: Mar. 4, 1996

[30] Foreign Application Priority Data

Nov. 9, 1995 [KR] Rep. of Korea ................. 1995 40526
Dec. 14, 1995 [KR] Rep. of Korea ................. 1995 49777

[51] Int. Cl.⁶ .......................... H01L 29/40; H01L 29/80; H01L 31/112; H01L 31/20
[52] U.S. Cl. .................. 257/59; 257/239; 349/54
[58] Field of Search .................. 257/59, 309, 664, 257/739, 748, 749, 750; 437/189, 239, 206, 207; 349/167, 168, 54, 55

[56] References Cited

U.S. PATENT DOCUMENTS

| | | | |
|---|---|---|---|
| 5,075,674 | 12/1991 | Katayama et al. | 349/54 |
| 5,103,330 | 4/1992 | Fukami et al. | 349/54 |
| 5,334,860 | 8/1994 | Naito | 257/59 |
| 5,530,266 | 6/1996 | Yonehara et al. | 257/59 |
| 5,559,345 | 9/1996 | Kim | 257/59 |
| 5,559,366 | 9/1996 | Fogal et al. | 257/739 |

*Primary Examiner*—Stuart S. Levy
*Assistant Examiner*—Adriana Giordana

[57] ABSTRACT

A liquid crystal display device comprises a plurality of redundancy lines formed on a substrate, and a signal line covering the plurality of redundancy lines, whereby the aperture ratio is effectively increased.

26 Claims, 3 Drawing Sheets

LIQUID CRYSTAL DISPLAY DEVICE WITH DECREASED LINE WIDTH AND METHOD OF FORMING THE SAME

BACKGROUND OF THE INVENTION

1. Field of the Invention

The present invention relates to a liquid crystal display device and more particularly, to an improved liquid crystal display device including a plurality of redundancy line for reducing the line width of a signal line.

2. Description of Related Art

Generally, a liquid crystal display (LCD) device includes a bottom, plate having a plurality of thin film transistors (TFTs) and, a plurality of pixel, electrodes disposed thereon, a top plate composed of common electrodes and a, color filter for displaying color, a liquid crystal (LC) layer disposed between the top and bottom plates, and a pair of polarizers disposed on the top and bottom surfaces of the LCD device for selectively transmitting light.

The bottom plate includes a transparent, substrate made of glass or quartz a plurality of gate lines uniformly spaced in one direction, and plurality of data lines disposed perpendicular to the gate lines. These gate and data lines form pixel regions, each region having a pixel electrode therein. Each of the pixel regions includes a thin film transistor (TFT) for transmitting a data signal ot the data line to the pixel electrode according to a signal from the gate line. Here, the gate line functions as a gate electrode and the data line functions as a source electrode of the TFT.

Due to recent development of a high density liquid crystal display device having a large screen, a problem may arise where the gate line or data line is frequently severed. In order to protect the severance of these lines, a redundancy line is formed under the gate or data lines in the conventional LCD devices.

As shown in FIGS. 1 and 2, a conventional liquid crystal display includes a gate line 3, a data line 4, a pixel electrode 5 and only one redundancy line 1 disposed underneath either the gate line 3 or data line 4. However, such conventional liquid crystal displays as shown in FIG. 2 may encounter some problems. For example, the line width of the gate line or data line cannot. be reduced even though a, redundancy line is used underneath the gate line or data line. This is because the signal line requires a predetermined resistance in order for an imaging signal, to be transmitted at high speed. This prevents unconditional reduction of the line widths. As a result, low aperture ratio is obtained. The aperture ratio indicates how much of a surface area of the pixel region actually transmits light.

SUMMARY OF THE INVENTION

Accordingly, it is an object of the present invention to provide an. improved liquid crystal display device which eliminates the above problems encountered with conventional liquid crystal display devices.

Another object of the present invention is to provide a liquid crystal display device including a signal line, and a plurality of redundancy lines disposed below the signal line for increasing the effective width of the signal line thereby increasing the aperture ratio of the LCD device.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a liquid crystal display device for displaying an imaging. signal, comprising: a plurality of redundancy lines and a signal line covering the plurality of redundancy lines, thereby increasing the ratio of the effective width of the signal line to the width of the signal lines.

The present invention is also directed to a method of forming a signal line in a liquid crystal display device, comprising the steps of: formaing as plurality of redundancy lines, and covering the plurality of redundancy lines with a signal line thereby increasing the ratio of the effective width of the signal line to the width of the signal line.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Referring now in detail to the drawings for the purpose of illustrating preferred embodiments of the present invention, the liquid crystal display device as shown in FIGS. 3–10, includes a substrate, 11, a plurality of redundancy lines 12 formed on the upper portion of the substrate 11 with a predetermined space between the redundancy lines, a gate line 13, a data line 14, and a pixel electrode 15. The redundancy lines 12 are disposed on the substrate 11 and extend with the gate, line 13 and/or data line 14 underneath the gate line 13 and/or data line 14. The plurality of redundancy lines can include at least one of the following materials: a-Si, n$^+$a-Si.

Accordingly, a. plurality of step coverages of the gate line 13 or data line 14 are formed. Consequently, the effective width of the gate line 13 or data line 14 is increased compared to the width of the line, according to the height and cross-sectional shape of the redundancy lines 13 As the number of redundancy lines is increased, a surface area to be covered by the signal line over the redundancy lines is increased, which in effect increases the effective width of the signal line.

Figure 1:
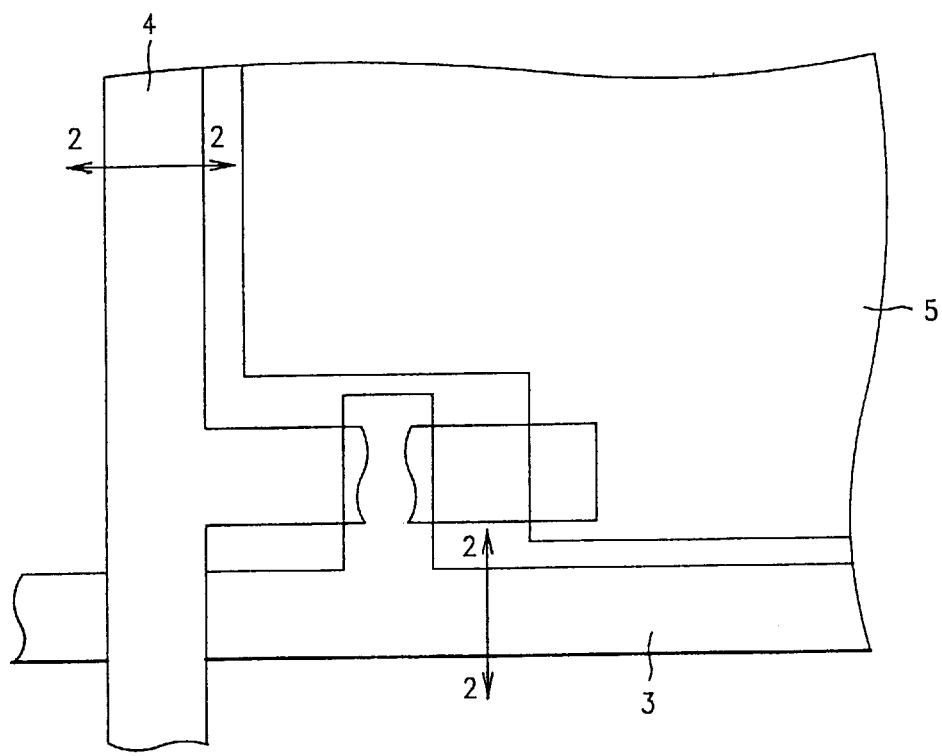
FIG. 1 is a layout view of a conventional liquid crystal display device.
Figure 2:
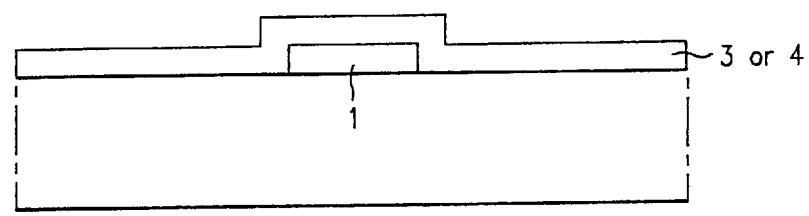
FIG. 2 is a cross-sectional view of FIG. 1, taken along line 2—2.
Figure 3:
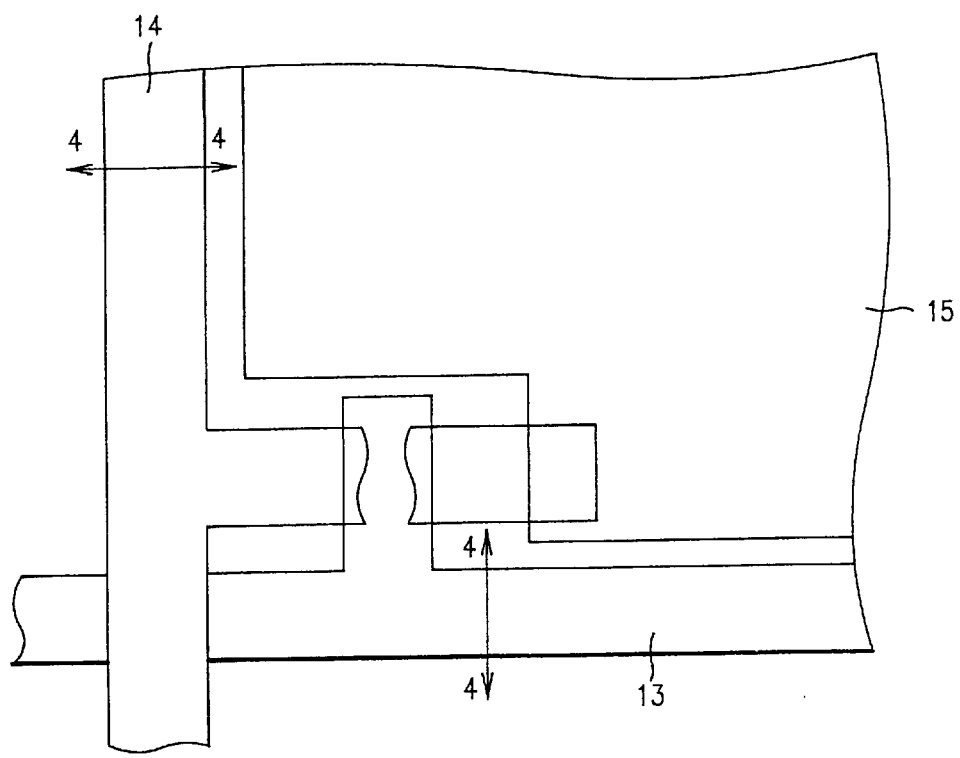
FIG. 3 is a layout view of a liquid crystal display device according to the embodiments of the present invention.
Figure 4:
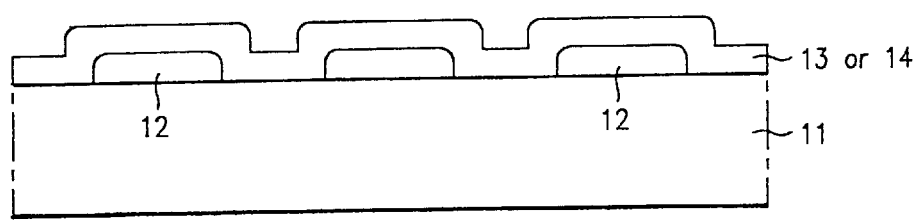
FIGS. 4–10 are examples of a cross-sectional view of FIG. 3, taken along line 4—4.
Figure 5:
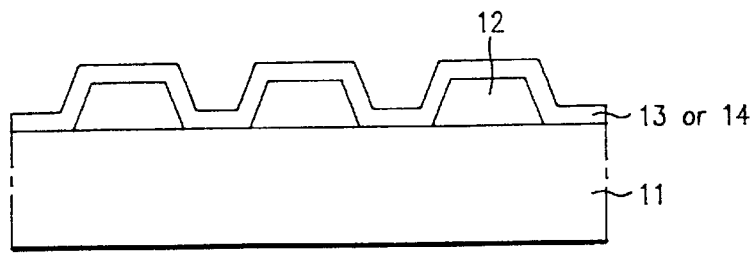
Figure 6:
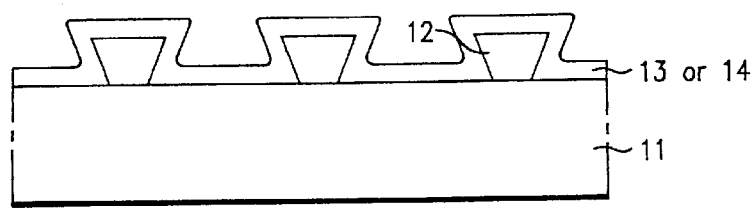
Figure 7:
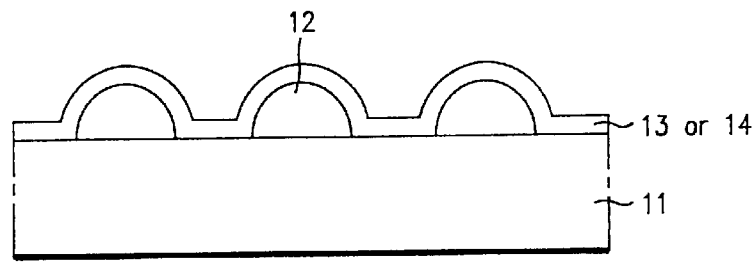
Figure 8:
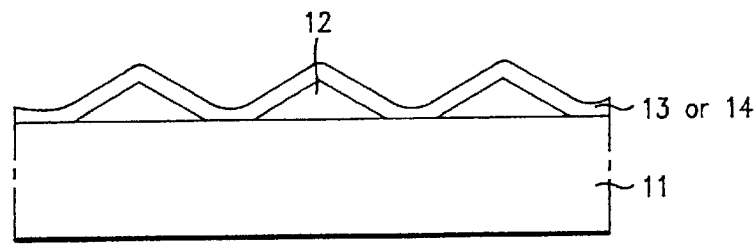
Figure 9:
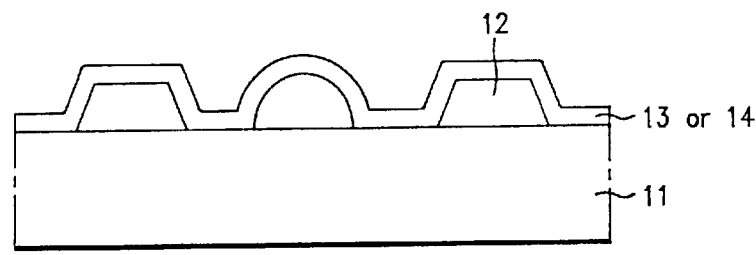
Figure 10:
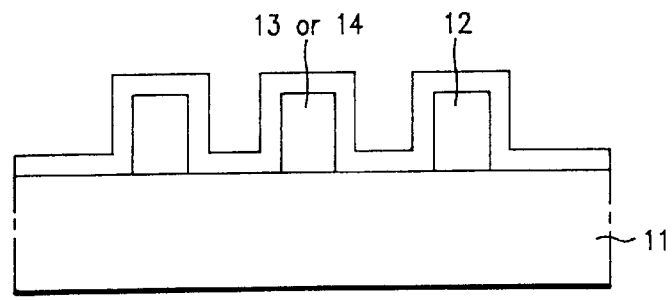

FIGS. 4–10 show examples of a cross-sectional view, of the signal line taken alone line 4—4 of FIG. 3. As shown, the shape or size of the redundancy lines can be varied to increase the effective width of the signal line. For example, the cross-sectional shape of the redundancy lines can be rectangular, trapezoidal, invertedly trapezoidal, rounded, and triangular, as shown in FIGS. 4–8, respectively; FIG. 9 Shows that the shape of one redundancy line can be different from that of another and FIG. 10 shows that the height of the redundancy line can be greater than its width. Then, the width of the signal line can be decreased as the resistance of the signal line is maintained or decreased and, thus, the aperture ratio cab be increased.

Furthermore, the plurality of redundancy lines can be substituted with a plurality of conductive lines or a plurality of non-conductive. lines, to increase the effective width of the signal line. The plurality of conductive lines can include at least one of the following elements. Al, Cr, Al/Ta, Mo. The plurality of nonconductive lines can include at least one of the following is materials: SiNx, SiOx.

In the crystal display device of the present invention, the width of each of the gate lines and data lines can be reduced without sacrificing the level of line resistance necessary for transmitting signals, because a plurality of redundancy disposed under each of these signal lines increase the effective width of these Signal lines.

Accordingly, the liquid crystal display device of the present invention has a number of advantages such as, for example, the width of the gate or data line 12 can be reduced for effectively increasing the aperture ratio and for effectively reducing the resistance of the line by using a signal line covering a plurality of redundancy lines.

The invention being thus described, it will be obvious that the same may be varied in many ways. Such variations are not to be regarded as a departure from the spirit and scope of the invention, and all such modifications as would be obvious to one skilled in the art are intendod to be included within the scope of the following claims.

What is claimed is:

1. A liquid crystal display device for displaying an imaging signal, comprising:
    a plurality of redundancy lines; and
    a signal line covering the plurality of redundancy lines thereby increasing an effective width of the signal line, wherein the plurality of redundancy lines do not contact each other.

2. A device as in claim 1, wherein:
    said plurality of redundancy lines are formed so that predetermined spaces separate said redundancy lines from each other.

3. A device as in claim 2, wherein:
    said signal line substantially fills at least one of the predetermined spaces.

4. A device as in claim 1, wherein:
    a cross section of each redundancy line is substantially rectangular.

5. A device as in claim 4, wherein:
    a width of the substantially rectangular cross section is greater than the height thereof.

6. A device as in claim 4, wherein:
    a height of the substantially rectangular cross section is greater than the width thereof.

7. A device as in claim 1, wherein:
    said signal line is one of a data line and a gate line.

8. A device as in claim 1, wherein:
    a cross-section of one redundancy line is different from a cross section of at least one other redundancy line so as to improve an aperture ratio of the device.

9. A device as in claim 1, wherein:
    a cross section of each redundancy line is one of substantially trapezoidal, substantially invertedly trapezoidal, triangular, and rounded.

10. A device as in claim 1, wherein:
    said plurality of redundancy lines include at least one of the following: Al, Cr, Al/Ta, Mo, a-Si, n$^+$ a-Si.

11. A device as in claim 1, wherein the plurality of redundancy lines extend for a substantially same length as a length of the signal line.

12. A device as in claim 1, wherein the plurality of redundancy lines are substituted with a plurality of non-conductive lines so as to increase an effective width of the signal line, the plurality of non-conductive lines including at least one of the following: SiNx and SiOx.

13. A device as in claim 1, wherein the signal line completely covers the plurality of redundancy lines.

14. A method of forming a signal line in a liquid crystal display device, the method comprising the steps of:
    forming a plurality of redundancy lines; and
    covering the plurality of redundancy lines with a signal line thereby increasing an effective width of the signal line, wherein the plurality of redundancy lines do not contact each other.

15. A method as in claim 14, wherein:
    the step of forming forms the plurality of redundancy lines so that predetermined spaces separate the redundancy lines from each other.

16. A method as in claim 15, wherein:
    the step of covering substantially fills at least one of the predetermined spaces.

17. A method as in claim 14, wherein:
    a cross section of each redundancy line is substantially rectangular.

18. A method as in claim 17, wherein:
    a width of the substantially rectangular cross section is,greater than the height thereof.

19. A method as in claim 17, wherein:
    a height of the substantially rectangular cross section is greater than the width thereof.

20. A method as in claim 14, wherein:
    the signal line is one of a data line and a gate line.

21. A method as in claim 1, wherein:
    a cross-section of one redundancy line is different from a cross section of at least one other redundancy line so as to improve an aperture ratio of the device.

22. A method as in claim 21, wherein:
    a cross section of each redundancy line is one of substantially trapezoidal, substantially invertedly trapezoidal, triangular, and rounded.

23. A method as in claim 14, wherein:
    the plurality of redundancy lines include at least one of the following: Al, Cr, Al/Ta, Mo, a-Si, n$^+$ a-Si.

24. A method as in claim 14, wherein the plurality of redundancy lines extend for a substantially same length as a length of the signal line.

25. A method as in claim 14, wherein the plurality of redundancy lines are substituted with a plurality of non-conductive lines so as to increase an effective width of the signal line, the plurality of non-conductive lines including at least one of the following: SiNx and SiOx.

26. A method as in claim 14, wherein the signal line completely covers the plurality of redundancy lines.

* * * * *